United States Patent [19]
Knott

[11] Patent Number: 5,297,908
[45] Date of Patent: Mar. 29, 1994

[54] APPARATUS AND METHOD FOR TRANSPORTING AUTOMOBILES IN AN ENCLOSED SEMI-TRAILER

[75] Inventor: James M. Knott, Springdale, Ark.

[73] Assignee: J. B. Hunt Transport Services, Inc., Lowell, Ark.

[21] Appl. No.: 13,042

[22] Filed: Feb. 4, 1993

[51] Int. Cl.$^5$ ............................................. E04H 6/06
[52] U.S. Cl. .......................... 410/26; 187/8.56; 187/8.41; 254/89 R; 414/228
[58] Field of Search .............. 414/227, 434, 228, 439, 414/229, 441, 498, 786; 187/8.41, 8.56, 24; 254/89 R; 410/13, 18, 24, 24.1, 25, 26, 27, 28, 29, 29.1

[56] References Cited

U.S. PATENT DOCUMENTS

| | | | |
|---|---|---|---|
| 1,106,684 | 8/1914 | Simonds | 187/8.56 |
| 1,751,874 | 3/1930 | Moore | |
| 2,233,055 | 2/1941 | Kennedy | 410/26 |
| 2,497,472 | 2/1950 | Sims | 254/91 |
| 2,538,517 | 1/1951 | Hayden | 187/9 |
| 2,564,267 | 8/1951 | Manke | 254/89 R |
| 2,579,688 | 12/1951 | McCormick | 187/19 |
| 2,655,223 | 10/1953 | Villars | 254/89 R |
| 2,754,933 | 7/1956 | Gallay | 187/8.56 |
| 3,521,728 | 7/1970 | Maurakami et al. | 187/8.56 |
| 3,637,099 | 1/1975 | Perrier | 214/660 |
| 4,124,119 | 11/1978 | Nordstrom | 410/13 X |
| 4,582,500 | 4/1986 | Hanson | 446/423 |
| 4,701,086 | 10/1987 | Thorndyke | 410/26 |
| 4,786,222 | 11/1988 | Blodgett | 410/29 |
| 4,797,049 | 1/1989 | Gearin et al. | 414/498 X |
| 4,911,590 | 3/1990 | Green | 410/26 |
| 4,992,013 | 2/1991 | Westerdale | 410/26 X |
| 5,051,046 | 9/1991 | Oren | 410/29.1 |
| 5,213,458 | 5/1993 | Preller et al. | 410/26 |

*Primary Examiner*—Frank E. Werner
*Assistant Examiner*—James Eller
*Attorney, Agent, or Firm*—Ray F. Cox, Jr.

[57] ABSTRACT

The present invention relates to an apparatus and method for converting a semi-trailer or intermodal shipping container from carrying general freight cargo to carrying automobiles. More specifically, the present invention provides for a lift mechanism which is powered by the drive wheels of the automobile being carried by the lift so that a plurality of automobiles may be carried in two levels in an enclosed semi-trailer or intermodal shipping container. The method of the present invention is also adaptable to being employed in piggy back transportation of semi-trailers or intermodal shipping containers on railroad cars. The apparatus of the present invention is designed for flexibility in use and ease of assembly and disassembly which comprises lift assemblies based on the use of ball screws powered from flexible cable drives.

8 Claims, 5 Drawing Sheets

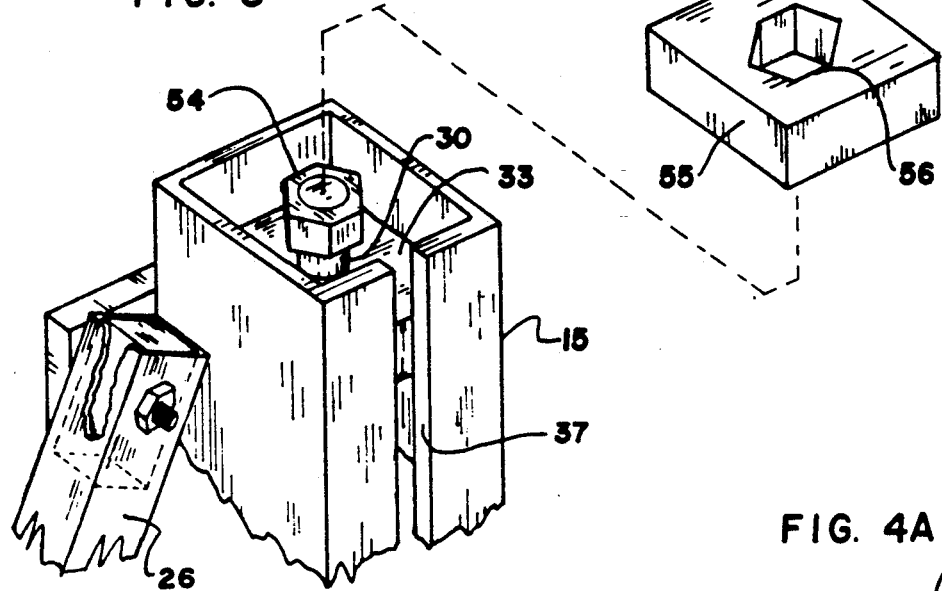
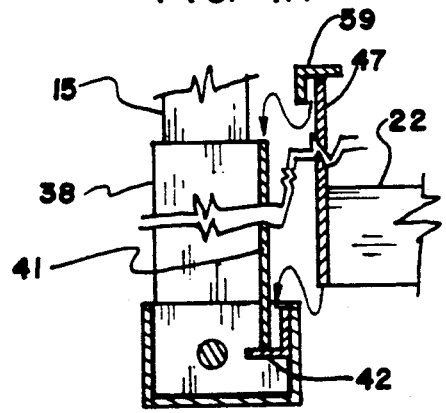
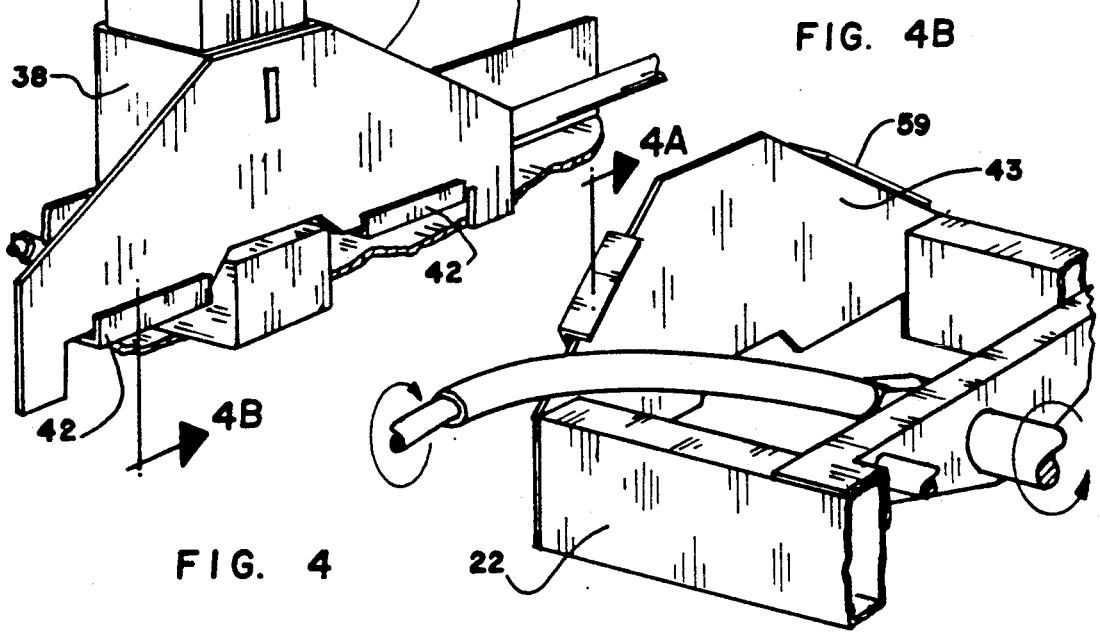

5,297,908

APPARATUS AND METHOD FOR TRANSPORTING AUTOMOBILES IN AN ENCLOSED SEMI-TRAILER

BACKGROUND OF THE INVENTION

1. Technical Field

The present invention relates to an apparatus and method for transporting automobiles by converting a semi-trailer from carrying general freight cargo to carrying automobiles. More specifically, the present invention provides for a lift mechanism which is powered by the drive wheels of the automobile being carried by the lift so that a plurality of automobiles may be carried in two levels in an enclosed semi-trailer. Alternative embodiments of the method of the present invention provide for transportation of automobiles by semi-trailers alone, by piggy-back transportation on railcars or by intermodal shipping containers. As used herein, the terms "semi-trailer" or "enclosed semi-trailer" should be understood to include standard intermodal shipping containers also.

2. Description of the Prior Art

The transportation of automobiles from the manufacturer to the dealer is normally by means of specialized automobile hauling trailers, trucks and railcars. Trailers and trucks designed for carrying automobiles are uniquely adapted for high efficiency in carriage of that particular type of commodity and are not suitable for use as general freight carriers. General freight, by contrast, is normally carried in enclosed semi-trailers which can carry a wide variety of goods since they do not possess the unique specialized adaptations required for carrying automobiles.

The two types of vehicles described above, namely the automobile carrying trailer and the general freight carrying trailer, are thus adapted to their own particular mode of operation and are unable to carry the type of freight for which the other is adapted. However, while the less specialized general freight carrying semi-trailer is able to haul a wide variety of goods, excepting automobiles, the automobile carrying trailer is so highly specialized that it is unable to haul any other type of freight other than the automobiles for which it is uniquely adapted. Thus, while general freight carrying trailers are normally able to arrange for transportation of goods on both legs of a round trip, the automobile carrying trailer is normally left to return empty from a particular designation.

The consequence of this situation is that automobile carrying trailers and trucks are often under-utilized which translates into high per-mile cost and generally higher freight rates.

Another disadvantage to the use of the specialized types of automobile carrying trailers is that they are generally open to the elements which exposes their cargo to vandalism and damage from environmental factors.

To solve the problems identified above, the present invention provides for an apparatus and method for converting an enclosed semi-trailer from the carriage of general freight to the carriage of automobiles. This concept of converting semi-trailers for carrying both general freight and automobiles is not new. For example, U.S. Pat. No. 5,051,046 issued to Oren on Sep. 24, 1991 for "Semi-Trailer Convertible for Hauling Automobiles" discloses an enclosed semi-trailer having tracks for the support of an upper level of automobiles. Likewise, U.S. Pat. No. 4,786,222 issued to Blodgett on Nov. 22, 1988 for "Folding Automobile Storage Deck Assembly" discloses a semi-trailer equipped to be used for either automobile or general freight transportation in which swiveling deck sections are provided for carrying two layers of automobiles. Also the same concept has been applied to the transportation of automobiles in standard intermodal shipping containers; e.g., U.S. Pat. No. 4,911,590 issued to Green on Mar. 27, 1990 for "Automobile Loading Rack and Method for Loading into Containers." Other patents which disclose the general concept of converting an enclosed trailer to the carriage of automobiles include U.S. Pat. Nos. 2,668,734 and 2,636,772. Also of interest are U.S. Pat. Nos. 4,701,086, 2,659,318 and 2,432,228.

Each of these patents generally disclose some means for carrying automobiles in a two-level configuration through the use of ramps or elevators.

In each of the patents cited above, the elevator or ramp mechanism is powered by an external source, for example, hydraulic rams or electric motors. The present invention provides for a lift mechanism which is operated by the drive wheels of the automobile being lifted into the upper position. Various concepts for employing the drive wheels of a vehicle to power a lift or elevator have been disclosed in the prior art. Examples of such concepts are disclosed in U.S. Pat. Nos. 3,637,099, 3,521,728, 2,754,933, 2,579,688, 2,538,517, 2,497,472 and 1,751,874. Such concepts have even been disclosed for use in connection with toy vehicles; e.g., U.S. Pat. No. 4,582,500. To the best knowledge of the inventor, however, the concept of an automobile powered lift has never been applied to the unique problems in converting an enclosed semi-trailer from the carriage of general freight to the carriage of automobiles.

It is important to note that many of the same problems identified above in relation to specialized trailers and trucks for the carriage of automobiles also are true of the specialized railcars required for the transportation of automobiles by rail. The apparatus and method of the present invention is also adaptable to being employed in the rail transportation of automobiles through the use of the "piggyback" system for the transportation of enclosed semi-trailers. By preloading automobiles into semi-trailers using the method and apparatus of the present invention, greater flexibility and efficiency in the rail transportation of automobiles is possible. In addition, the method and apparatus of the present invention may also be applied to loading and transportion of automobiles in standard intermodal shipping containers. Loading automobiles into shipping containers has all the advantages of shipping semi-trailers "piggyback" by rail and in addition shipping containers may be double stacked for even greater efficiencies. Throughout the following discussion of the present invention, the preferred embodiments, and claims, the use of the terms "semi-trailer" or "enclosed semi-trailer" are intended to embrace intermodal shipping containers also except where specifically distinguished.

SUMMARY OF THE INVENTION

The present invention is for a method and apparatus for transporting automobiles by converting enclosed semi-trailers to automobile carriers utilizing a lift powered by the drive wheels of the automobile itself. By using this mechanism to operate the lift, the entire apparatus can be greatly simplified and many of the complications inherent in prior art designs can be eliminated. Simplifying the design and keeping the working apparatus to a minimum is highly significant in developing a workable solution to the problem of converting an enclosed semi-trailer from the carriage of general freight to the carriage of automobiles. Heavy and cumbersome equipment, particularly, the more complicated pieces of apparatus disclosed in the prior art, render the concept unworkable by adding excessive weight, by interfering with the use of the semi-trailer for the transportation of general freight and by reducing the reliability of the apparatus.

Another significant aspect of the present invention is inherent in its light weight, ease of assembly or disassembly and minimal interference with the use of the semi-trailer for general freight.

In the present invention, a plurality, particularly two or three, automobile-powered lifts are positioned in an enclosed semi-trailer. An automobile may be driven onto a lift where one carriage holds the non-driven wheels and another carriage holds the driven wheels. The driven wheels can be put into motion, which causes a roller under each of the driven wheels to rotate. The rotational motion of the rollers are transmitted by flexible shafts to gear boxes associated with four supporting columns, one adjacent to each wheel of the automobile. Each support column contains a ball screw which is mechanically connected to the carriages supporting the driven and non-driven wheels. Action of the ball screws, therefore, lifts or lowers the automobile depending on the direction of motion of the driven wheels. Once an automobile has been lifted into position, another automobile may be driven underneath the lift. In this way automobiles are loaded in stacks two vehicles high until the entire semi-trailer is filled. In order to unload the semi-trailer, the process is simply reversed.

An alternative embodiment of the present invention carries the method one step further by transporting the filled semi-trailers piggy-backed on railcars. This has the advantage of avoiding the difficult and cumbersome loading and unloading of automobiles directly onto and off of specialized automobile carrying railcars. Further, this mode of transportation offers the possibility of greatly increasing the efficiency of transportation of automobiles and the utilization of semi-trailers. As noted above there is usually a problem with specialized automobile carrying trailers being underutilized. The present invention offers a solution to this problem. Once a semi-trailer utilizing the apparatus of the present invention is unloaded at its destination, the automobile-powered lifts may be easily disassembled and removed from the semi-trailer. The trailer is then free to be returned to general freight service. The disassembled lifts may be accumulated and at periodic intervals shipped to the point of origin to begin the process over again. This method is only possible due to the employment of the automobile-powered aspect of the present invention which obviates the need for complicated external power sources.

It is thus an object of the present invention to increase productivity and efficiency in the utilization of semi-trailers for transporting automobiles by allowing semi-trailers to be used for both the transportation of automobiles and for the transportation of general freight.

A further object of the present invention is to provide a secure enclosed environment for the transportation of automobiles in which the transported automobiles are less exposed to the hazards of vandalism and the environment, including thrown rocks, mud, water and the like.

It is also an object of the present invention to provide an economical means for converting an enclosed semi-trailer to the carriage of automobiles, and to provide for a mechanism which is simple, efficient, cost effective and which requires low maintenance.

Other advantages and objects of the present invention will become apparent from the following detailed description of the preferred embodiments, with particular reference to the accompanying drawings.

BRIEF DESCRIPTION OF THE DRAWINGS

FIG. 3 is a partial perspective view of the top of a support column showing a lock nut arrangement to prevent rotation of the screw.

FIG. 4 is a partial perspective view detailing the attachment of the carriage to the support column.

FIGS. 4a and 4b are detailed sectional views showing the means of attachment of the carriage to the support column.

DETAILED DESCRIPTION OF THE PREFERRED EMBODIMENTS

Figure 1:
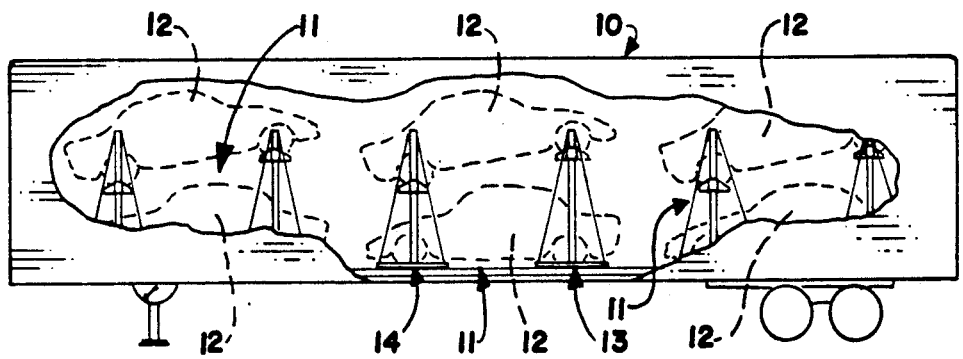
FIG. 1 is a partially cut away elevation view of a typical semi-trailer showing three sets of automobile powered lifts in place with six automobiles positioned in three stacks of two each.

The overall appearance of the present invention may be described with reference to FIGS. 1, 2 and 6. The apparatus of the present invention is an automobile-powered automobile lift to be used in conjunction with an enclosed semi-trailer 10. As shown in FIG. 1, three of the automobile-powered automobile lifts 11 of the present invention are shown in position in the enclosed semi-trailer 10. Depending on the length of the semi-trailer 10 and the lengths of the automobiles 12, up to three stacks of two automobiles 12 each can be loaded into the semi-trailer 10.

Figure 2:
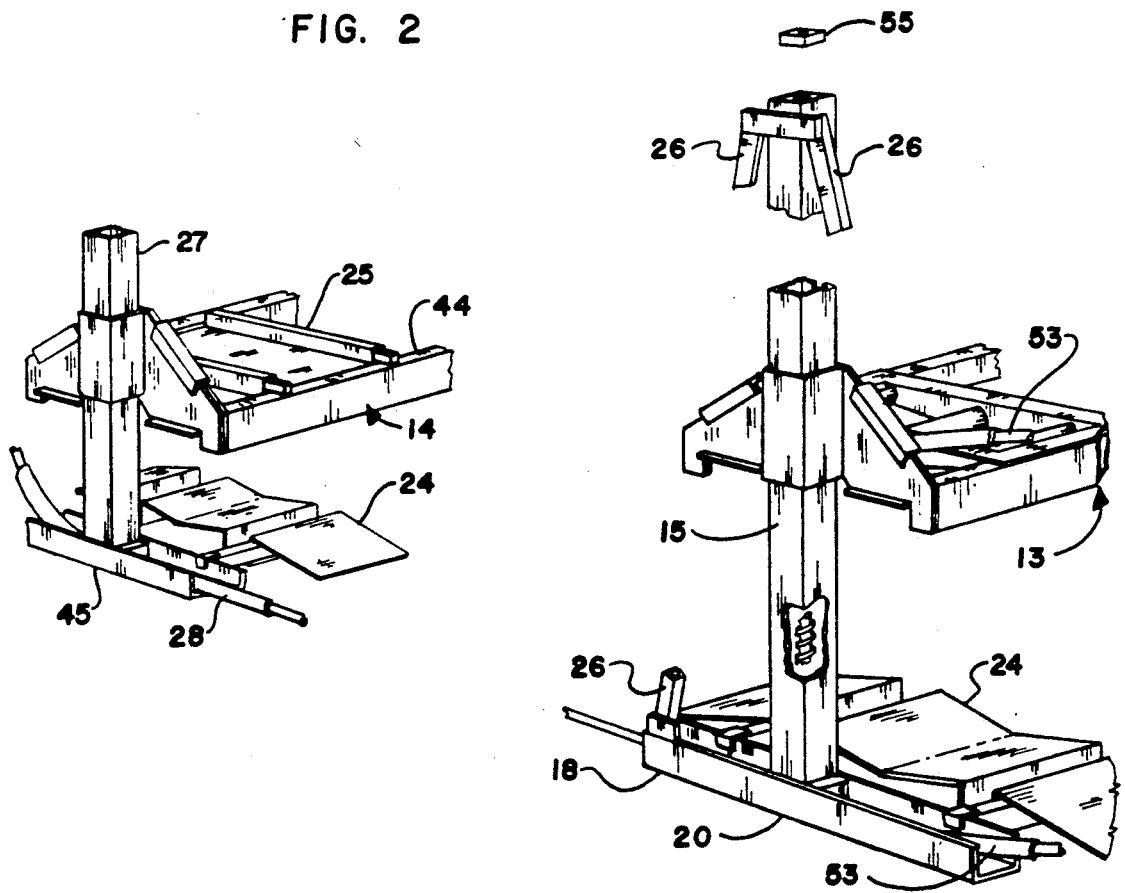
FIG. 2 is a partial exploded perspective view of one front support column and one rear support column showing the relationship of the front carriage and the rear carriage to the front and rear support columns.

Each lift 11 comprises a front lift assembly 13 and a rear lift assembly 14 as shown on FIGS. 1 and 2. Most of the components of the front lift assembly 13 and the rear lift assembly 14 are identical.

Figure 6:
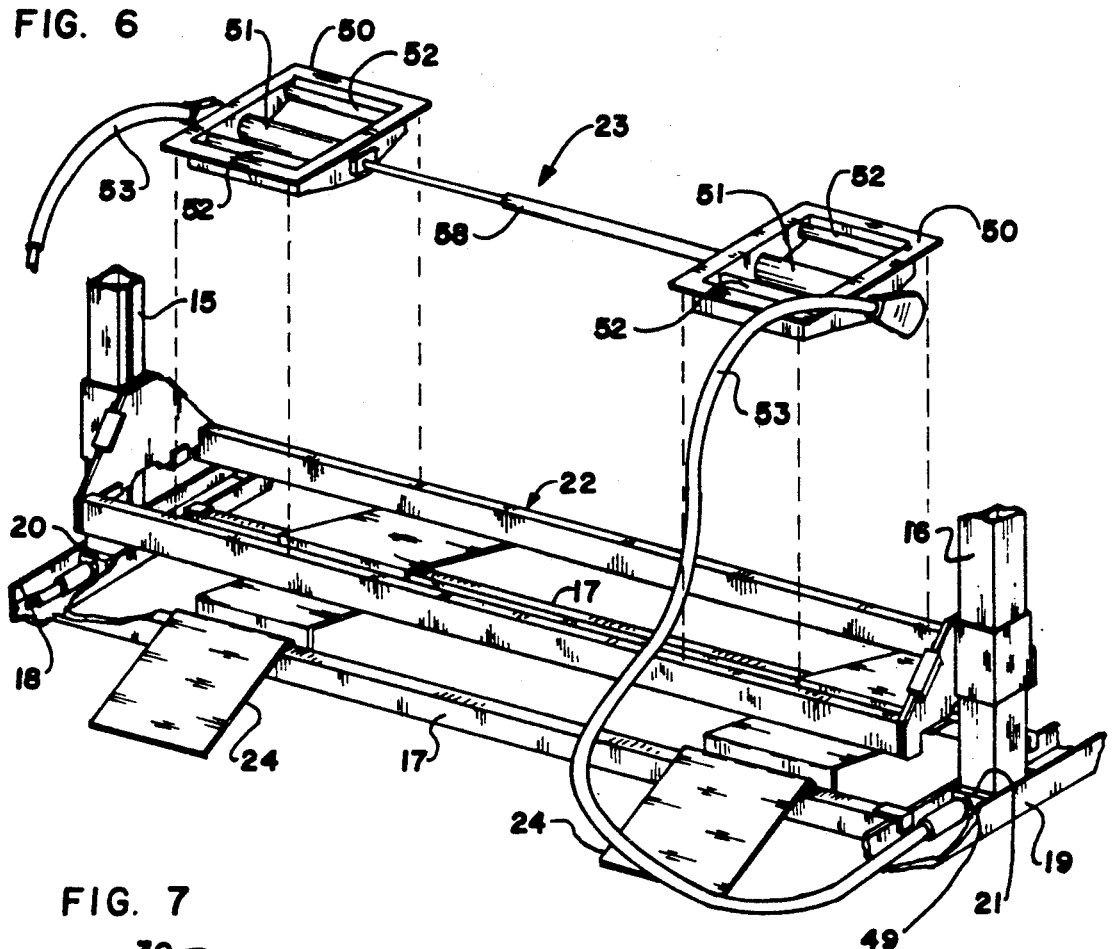
FIG. 6 is an exploded perspective view of the carriage and support columns showing the removable roller assembly.

With reference to FIGS. 2 and 6, the front lift assembly 13 includes a pair of front support columns 15, 16 which are spaced apart and braced by a pair of transverse braces 17. The transverse braces 17 are rigidly attached to left and right U channels 18, 19 which in turn contain left and right front column gear boxes 20, 21 which support left and right front support columns 15 and 16 respectively. The front lift assembly 13 also comprises a front wheels carriage 22. The front wheels carriage 22 supports a removable roller assembly 23. The front lift assembly 13 is also provided with ramps 24 to allow an automobile 12 to be driven over the transverse braces 17. The ramps 24 also act to restrain the wheels of an automobile 12 loaded into the lower position when the lift 11 is in the upper position.

The rear lift assembly 14 is identical to the front lift assembly 13 as described above with the exception of the removable roller assembly 23. In place of the removable roller assembly 23, the rear lift assembly 14 is provided with a pair of removable wheel receptacles 25, one of the pair of which is shown in FIG. 2. The wheel receptacles 25 serve as devices to receive and restrain each of the non-driven wheels of the automobile 12. The non-driven wheels may be either the front or the rear wheels of the automobile 12 depending upon whether the automobile 12 is a rear drive or front drive model.

In addition to the features described above, both the front lift assembly 13 and the rear lift assembly 14 are strengthened against movement backwards or forwards by means of braces 26. A typical bracing scheme is shown in FIG. 2 in which the braces 26 are attached to the left front support column 15 and to the left front U channel 18 in an angled relationship so as to brace the support column 15 against movement backwards and forwards. An identical bracing arrangement is provided for the right front support column 16 and the rear support columns 27.

It is important to note that the front lift assembly 13 and the rear lift assembly 14 are independent structures attached only by power takeoff shafts 28 as will be described more fully below. The spacing between the front lift assembly 13 and the rear lift assembly 14 can, therefore, be adjusted so as to accommodate automobiles 12 of varying wheel base. In practice the front lift assembly 13 and the rear lift assembly 14 may be fastened to the semi-trailer 10 in various ways, including nails, screws or bolts. It is thus possible to provide for either permanent or semi-permanent installation of the present invention in a semi-trailer 10.

Figure 5:
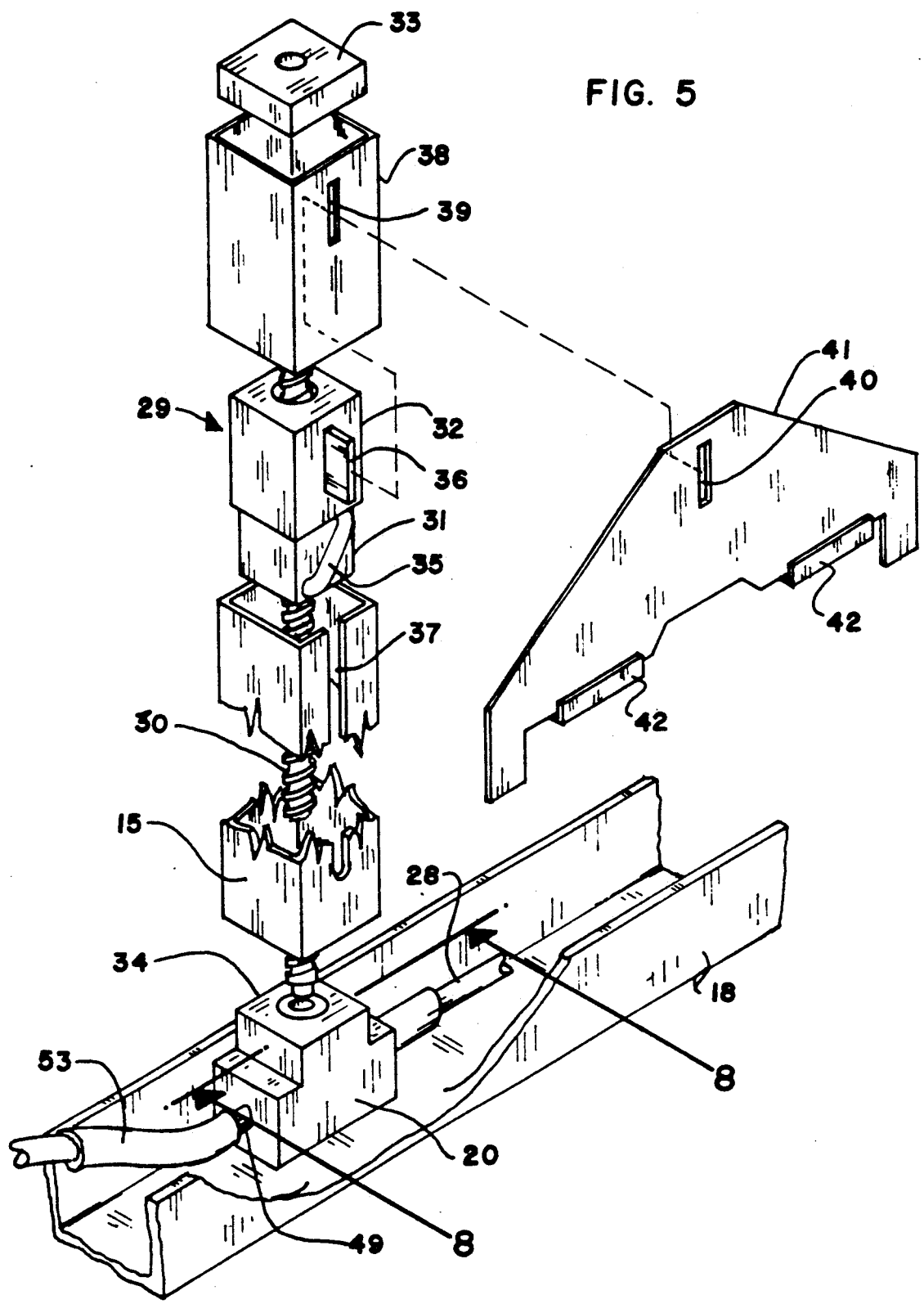
FIG. 5 is an exploded perspective view partially cut away to show the screw assembly within the support column and the means of mechanical connection of the screw assembly to the carriage and the gear box.
Figure 7:
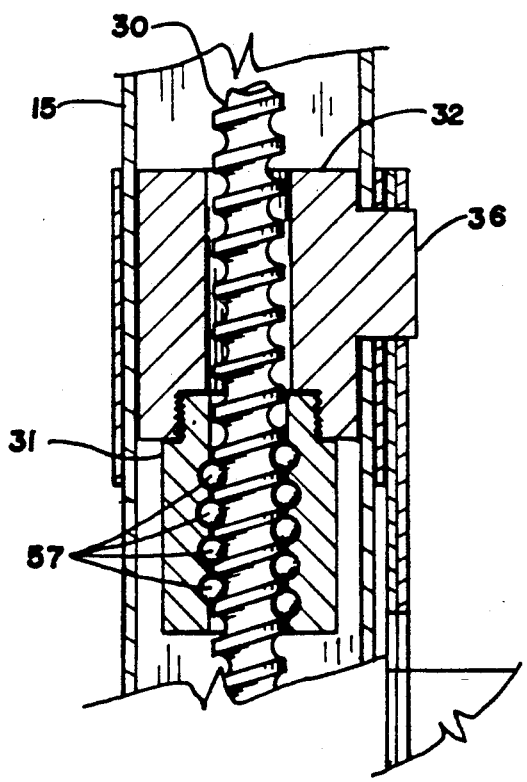
FIG. 7 is a partial sectional view of the screw assembly within the support column detailing the ball nut and means of attachment to the carriage.

Both the front support columns 15, 16 and the rear support columns 27 contain ball screw assemblies 29. The functioning of the ball screw assembly 29 may be described with reference to FIG. 5. While FIG. 5 shows only front support column 15, the construction for front support column 16 and rear support columns 27 are identical. As described previously, front support column 15 rests upon gear box 20, which in turn is rigidly fastened to the inside of U-channel 18. The ball screw assembly 29 comprises the screw 30, the ball nut 31, the carriage attachment block 32, an upper bearing plate 33, and a lower bearing block 34. The lower bearing block 34 is mounted to the gear box 20. The screw 30 rides in and bears upon the lower bearing block 34. The upper bearing plate 33 located at the top of the support column 15 supports and guides the top of the screw 30. The arrangement of the carriage attachment block 32 relative to the ball nut 31 is shown in more detail in FIG. 7. The screw 30 passes through the ball nut 32 to which it is operatively connected by a series of ball bearings 57 which ride in complementary grooves in the screw 30 and the ball nut 31. The ball bearing return 35 is shown on FIG. 5. It may thus be seen that rotation of the screw 30 causes the ball nut 31 to be moved up and down along the support column 15. The carriage attachment block 32 is rigidly affixed to the ball nut 31 and is thus carried along with the ball nut 31 as the screw 30 rotates. The carriage attachment block 32 is provided with a projection 36. The projection 36 extends through a slot 37 in support column 15 as shown on FIG. 5. Again, with reference to FIG. 5 a rectangular sleeve 38 rides along the outside of support column 15. Rectangular sleeve 38 contains an opening 39 through which projection 36 extends. It may be seen, therefore, that the ball nut 31, the carriage attachment block 32 and the sleeve 38 mechanically function as a single unit which moves up and down the support column 15 as the screw 30 is rotated. The projection 36 extends far enough beyond the rectangular sleeve 3 to extend into an opening 40 on the carriage support plate 41 which is rigidly attached to rectangular sleeve 38. The carriage support plate 41 is provided with a pair of angle brackets 42 which provide for the means for detachably mounting the front wheels carriage 22 between the left support column 15 and the complementary structure on the right support column 16. Furthermore, the end plate 43 is provided with angle brackets 59 which fit over carriage support plate 41.

The mounting of the front support carriage 22 to the carriage support plate 41 is described with reference to FIG. 4. The end plate 43 of the front support carriage 22 fits over and into the space formed between the brackets 42 and the support plate 41. Also as shown is FIG. 4a, the space formed between brackets 59 and end plate 43 fits over carriage support plate 41. As shown in detail in the sectional drawing of FIG. 4b, the weight of the front support carriage is, therefore, born by the sleeve 38 through the support plate 41 and brackets 42. It may, therefore, easily be seen that rotation of the screw 30 thus results in raising or lowering of the support carriage 22. While the operation of the screw 30 resulting in movement of the support carriage 22 has been described with relation to the left front support column 15, it is to be understood that identical and complementary features on right support column 16 operate to form the completely functioning front lift assembly 13. Likewise, the rear support carriage 44 operates in conjunction with rear support columns 27 in precisely the same fashion to form the rear lift assembly 14.

It is important to note that due to the ease of disassembly of the front support carriage 22 from the front support columns 15, 16 and disassembly of the rear support carriage 44 from the rear support columns 27, and furthermore due to the lack of structural attachments between the front lift assembly 13 and the rear lift assembly 14, the entire structure can be easily assembled and disassembled for storage.

Figure 8:
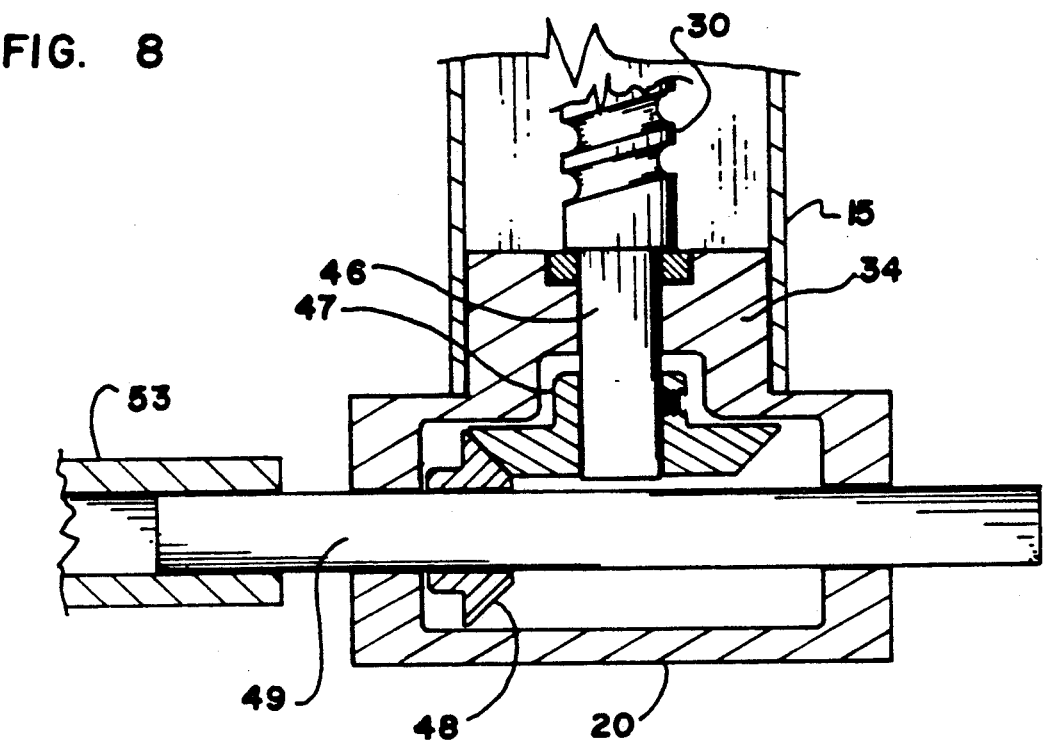
FIG. 8 is a sectional detailed view of the base of a support column and gear box.

The operation of the front support column gear boxes 20, 21 and the rear support column gear boxes 45 are explained with reference to FIG. 8. FIG. 8 provides a sectional view of front support column gear box 20, however, it should be understood that except with respect to the discussion of gear ratios which follows, the construction and operation of gear boxes 21, 45 are identical. It may be seen from FIG. 8 that screw 30 bears on bearing block 34 which in turn bears on gear box 20. Left front support column 15 is attached to bearing block 34. Screw 30 extends by a screw shaft 46 through bearing block 34 into the interior of gear box 20. Screw shaft 46 is attached to a bevel gear 47. Bevel gear 47 meshes with complementary bevel gear 48 which converts the vertical rotation of screw 30 into the horizontal rotation of driveshaft 49 to which complementary bevel gear 48 is attached. While in practice the gear ratio between bevel gears 47 and 48 may be constant among the gears of all four support columns 15, 16, 27, it has been found to be desirable to vary the gear ratios between the front columns 15, 16 and the rear columns 27. If all the driveshafts 49 are driven at the same rate, varying the gear ratios causes the screws 30 to rotate at a different rate in the front lift assembly 13 versus the rear lift assembly 14. A 2:1 drive ratio for the front lift assembly 13 versus a 3:1 drive ratio for the rear lift assembly 14 results in the front support carriage 22 being advanced faster and, therefore, higher than the rear support carriage 44. The significance of this arrangement will be discussed below in conjunction with the operation of the overall invention.

The construction and operation of the removable roller assembly 23 is described with reference to FIG. 6. As described above, the removable roller assembly 23 is placed in and supported by the front support carriage 22. The roller assembly 23 may be removed from the support carriage 22 for disassembly of the entire invention or for other purposes as described below. The roller assembly 23 comprises a pair of drive wheel receptacles 50. Each drive wheel receptacle 50 includes a drive roller 51 and a pair of idler rollers 52. The idler rollers 52 are rotatably supported by the drive wheels receptacles 50. The idler rollers 52 rotate freely and are not driven. The idler rollers 52 serve simply to provide a well to receive and support the drive wheels of an automobile 12. The drive wheels of the automobile 12 rest upon the drive rollers 51 with a sufficiently firm contact so that operation of the drive wheels of the automobile 12 cause the drive wheels of the automobile 12 to spin freely upon the supports provided by idler rollers 52 and drive the drive rollers 51 into rotation. If necessary a spring could be used to bias the drive rollers 51 into firm contact with the drive wheels of the automobile 12. The drive rollers 51 are connected together by a drive roller shaft 58 which assures uniform rotation of both drive rollers 51. Each drive roller 51 is connected to a flexible shaft 53. Each flexible shaft 53 connects to the driveshaft 49 of its respective gear box 20, 21. Each driveshaft 49 of the front lift assembly 13 is connected by a power takeoff shaft 28 to the complementary driveshafts 49 of the rear lift assembly 14.

Operation of the invention may be described as follows. Initially the front support carriage 22 and the rear support carriage 44 are in a lowered position. An automobile 12 is driven onto the support carriages 22, 44 so that the drive wheels of the automobile 12 fall into the wells provided by the respective drive wheel receptacles 50. The non-driven wheels rest in the wheel receptacles 25 of the rear lift assembly 14. The drive wheels of the automobile 12 are now in contact with the drive rollers 51. Continued rotation of the drive wheels of the automobile 12 cause the drive rollers 51 to rotate which in turn produces rotary motion in the flexible shafts 53. The rotation of the flexible shafts 53 drive the driveshafts 49 of the gear boxes 20, 21 of the front lift assembly 13. The driveshafts 49 of the front lift assembly also drive the power takeoff shafts 28 which in turn drive the driveshafts 49 of the rear lift assembly 14. The gear boxes 20, 21, 45 then translate the horizontal rotation of the driveshafts 49 into the vertical rotation of the screws 30. The rotation of the screws 30 therefore acts to lift both the front support carriage 22 and the rear support carriage 44, thus raising the automobile 12. By appropriate adjustment of the gear ratios as described above, the automobile 12 may be raised so that the front of the automobile 12 is raised to a higher elevation than the rear of the automobile 12. The degree to which the automobile 12 is angled form the horizontal is limited so that there is no danger of the wheels of the automobile 12 being pulled from secure positions on either the front lift carriage 22 or the rear support carriage 44. In practice the suggested gear ratios described above have been found to be acceptable. The significance of this arrangement may be seen with respect to FIG. 1. By raising the front of the automobile 12 to a different elevation than the rear, the automobile 12 may be restrained from rearward motion when the semi-trailer 10 is put into forward motion. In addition, a second automobile may be driven under the first automobile. The ramps 24 facilitate this process by allowing the second automobile to pass easily over the transverse braces 17. The wells formed by the ramps 24 also serve to provide some restraint to motion by the second automobile. By adjusting the orientation of the first automobile 12, the second automobile may be positioned under the first automobile more easily. In addition, a greater packing density in the semi-trailer 10 may be achieved. As can be seen from FIG. 1, once a first automobile is placed on the lift 11 and lifted to a raised position and a second automobile is moved into position under the first automobile, it is then possible to continue to fill the semi-trailer 10 with a series of lifts so that stacks of two automobiles each may be created. A series of such stacks, therefore, can be used to completely fill the semi-trailer 10.

Unloading of the semi-trailer 10 is thus accomplished in precisely the reverse fashion. The second automobile of the last stack is driven out of the semi-trailer 10. The first automobile in the raised position is started and its drive wheels used in the opposite direction to operate the lift 11 so that it is lowered to the lowest position. After being placed in the lowest position, the first automobile is then driven out of the semi-trailer 10. In similar fashion each stack is unloaded until the semi-trailer 10 is completely unloaded. At this point, each of the automobile powered lifts 11 may be disassembled and removed, allowing the semi-trailer 10 to be converted to general freight usage or the automobile powered lifts 11 may remain in position for further use in transporting automobiles.

While an automobile 12 is in the raised position on the present invention, it may be desirable to assure that the front support carriage 22 and the rear support carriage 44 remain in the raised position. A locking mechanism is provided as shown in FIG. 3. Again, this mechanism is described with reference to left front support column 15, but the same mechanism may be used on each of the other support columns 16, 27. A hex nut 54 is rigidly fixed to the top of each screw 30 exterior of the upper bearing plate 33. A lock nut 55 is provided which is square in outline to fit within the upper part of support column 15. The lock nut 55 contains a hexagonal opening 56 which is sized to contain the hex nut 54. When the lock nut 55 is in place over the hex nut 54, rotation of the screw 30 is prevented. This provides an additional safety measure to ensure that once an automobile 12 is placed in the raised position it will not be accidentally lowered. In addition to the precautions mentioned above with respect to the use of the lock nut 55 and the varying gear ratios which allow the automobile 12 to be placed in an upended position, there are also various restraint devices which are well known in the prior art for securing an automobile for transit. These methods include, for example, straps to secure the axles of the automobile 12 to the lift 11.

While the operation of the present invention has been described in reference to one particular mode of operation, it is also important to note that the present invention may be operated with a great deal of flexibility due to the fact that the roller assembly 23 may be removed and repositioned in various configurations. For example, the roller assembly 23 may be removed from the front lift assembly 13 and repositioned to the rear lift assembly 14 to accommodate automobiles which may be either front wheel or rear wheel drive. In addition as shown in FIG. 1, multiple lifts 11 may be installed in a single semi-trailer 10. A roller assembly 23 from one of the lifts 11 may be moved to a position on another lift 11 so that an automobile 12 may be used to operate a separate lift 11. In addition, the same result may be obtained by attaching the flexible shaft 53 from the roller assembly 23 of one lift 11 to the driveshafts 49 of a separate lift 11. This discussion does not exhaust all of the possible configurations that may be employed with the present invention, all of which are contemplated to be encompassed within the scope of this invention, and failure to discuss a particular configuration does not imply exclusion of such a configuration from the scope of the present invention.

Once a semi-trailer 10 has been completely loaded in the fashion set forth above, the semi-trailer may then be transported to its destination for unloading. As an alternative embodiment to the method of the present invention, however, the semi-trailer 10 may be transported by railcar in the fashion known as piggy-back transportation. In this system the semi-trailer 10 may be loaded on a railcar for transportation to a destination at or near its final destination. Transportation by rail offers a number of advantages. For example, intermodal shipping containers adapted to piggy-back transportation may be actually loaded onto railcars in a two-container high or "double stack" configuration. This obviously offers great economies in transportation of automobiles. In addition, use of enclosed semi-trailers 10 for transportation of automobiles avoids environmental hazards that may be common to the open carriers commonly employed by railroads. In addition since the automobiles 12 are already arranged and stored in the semi-trailer 10, there is no need for railroad personnel to be involved in the cumbersome and inefficient process of loading automobiles individually onto a railcar.

An alternative embodiment of the method of the present invention for the transportation of automobiles 12 in an enclosed semi-trailer 10 using automobile powered automobile lifts 11 relates to the use of piggy-back railroad transportation as described above. One or more semi-trailers 10 may be loaded with automobiles 12 as described above. The semi-trailers may then be loaded onto railcars for transportation to a point at or near their ultimate destination. Upon arrival at the ultimate destination and upon unloading of the automobiles 12, the automobile powered lifts 11 may be disassembled and removed from the semi-trailer 10. The semi-trailer 10 may then be employed for general freight purposes. Since it would be quite unusual for there to exist a need to transport automobiles from the point of destination to the point of origin, the disassembled lifts 11 may be accumulated and returned to the point of origin after a number of lifts 11 have been accumulated. This allows a limited number of semi-trailers 10 to be used for the return of the disassembled lifts 11 to the point of origin and avoids the common problem of specialized car-carrying trucks being returned empty to the point of origin.

While the apparatus and method of the present invention have been described with reference to certain preferred embodiments and alternative preferred embodiments, it is to be understood that various modifications to the preferred embodiments would be obvious to one skilled in the art and that the above description is intended to be exemplary and not by way of limitation to the full scope of the invention which is set forth in the following claims.

What is claimed is:

1. An automobile-powered automobile lift for use in converting an enclosed semi-trailer to the transportation of automobiles, comprising:
   (a) a front lift assembly comprising: a front wheels carriage and a pair of front support columns, each of said front support columns having a front ball screw assembly comprising a front screw, a front ball nut, means for attachment of each of said front ball nuts to said front wheels carriage; and a front column gear box operatively connected to each of said front screws;
   (b) a rear lift assembly comprising: a rear wheels carriage and a pair of rear support columns, each of said rear support columns having a rear ball screw assembly comprising a rear screw, a rear ball nut, means for attachment of each of said rear ball nuts to said rear wheels carriage; and a rear column gear box operatively connected to each of said rear screws;
   (c) a roller assembly, means for removably mounting said roller assembly to said front lift assembly, said roller assembly comprising a pair of drive wheels cradles adapted to receive the drive wheels of an automobile, means for maintaining said drive wheels cradles in a spaced relationship, each of said drive wheels cradles comprising a drive roller and a pair of idler rollers disposed so as to form a well to receive and support the drive wheels of an automobile such that rotation of said drive wheels causes said drive roller to rotate, a shaft interconnecting said drive rollers, and a drive roller gear box operatively connected to each of said drive rollers;
   (d) a pair of power takeoff shafts operatively connecting each of said front column gear boxes to a respective one of said rear column gear boxes; and
   (e) a pair of flexible shafts operatively connecting each of said drive roller gear boxes to a respective one of said front column gear boxes, whereby rotational motion of said drive rollers is mechanically transferred to said front column gear boxes and said rear column gear boxes for elevating said front lift assembly and said rear lift assembly.

2. The apparatus of claim 1 wherein said front column gear boxes comprise a pair of mutually cooperating bevel gears characterized by a front column gear box gear ratio, and said rear column gear boxes comprise a mutually cooperating pair of bevel gears characterized by a rear column gear box gear ratio.

3. The apparatus of claim 2 wherein said front column gear box gear ratio is not equal to said rear column gear box gear ratio.

4. The apparatus of claim 1 further comprising means to releaseably operatively connect said flexible shafts to said front column gear boxes and means to releaseably operatively connect said power takeoff shafts to said front column gear boxes and said rear column gear boxes.

5. The apparatus of claim 1 further comprising means for securing a first automobile to said front lift assembly and means for securing said first automobile to said rear lift assembly.

6. The apparatus of claim 5 further comprising means for restraining a second automobile in position under said first automobile.

7. The apparatus of claim 1 further comprising means to lock each of said front screws and said rear screws to prevent rotational motion of said front screws and said rear screws.

8. The apparatus of claim 7 wherein said locking means comprises a lock nut associated with each of said front screws and said rear screws.

* * * * *